United States Patent Office 3,803,325
Patented Apr. 9, 1974

3,803,325
CENTRAL NERVOUS SYSTEM STIMULATION
Salvatore F. Biscardi, Cornwall, N.Y., assignor to General Foods Corporation, White Plains, N.Y.
No Drawing. Filed Mar. 31, 1972, Ser. No. 240,281
Int. Cl. A61k 27/00
U.S. Cl. 424—343                5 Claims

ABSTRACT OF THE DISCLOSURE

A method of producing central nervous systems (CNS) stimulation in a subject is disclosed comprising orally administering an effective amount of cis-carveol to the subject.

BACKGROUND OF THE INVENTION

This invention relates to a composition capable of producing central nervous system stimulatory effects when ingested.

Generally, central nervous system stimulation is characterized by diminished drowsiness, diminished psychic fatigue, facilitated mental and muscular efforts, increased arousal and awareness, the production of more sustained intellectual effort, and generally the promotion of the feeling of well being in the subject. It is desirable, of course, to use such a stimulant in conjunction with a foodstuff. Coffee, inherently containing amounts of caffeine, and cola beverages employing caffeine as an additive are examples of such foodstuffs.

The desirability of imparting central nervous system stimulation through the ingestion of a foodstuff, however, is offset by a combination of factors. The use of caffeine in foods is regulated to incorporation only in cola beverages and, hence, other stimulants must be found in order to provide a wider variety of food products possessing central nervous systems stimulatory effects. Further, other compounds possessing CNS stimulatory effects have been found to be incompatible with most food products due to the strong off-taste inherent in these compounds. Also, there exists compounds possessing CNS stimulation ability only in narrow dose ranges, and therefore, present problems in effective control of manufacturing procedures to obtain the desired stimulation in a foodstuff.

Accordingly, it is an object of this invention to produce central nervous system stimulation in a subject through the administration of a safe effective compound, and which can be accomplished through administration of the compound in a food product.

This and other objects will become more readily apparent upon reading the specification and claims which follow.

SUMMARY OF THE INVENTION

It has been found in accordance with this invention that the compound cis-carveol is an effective central nervous system stimulant at specified dosage levels. The material may be used in conjunction with a food product without seriously affecting the flavor and quality of the food.

DETAILED DESCRIPTION OF THE INVENTION

Cis-carveol is a natural occurring component of spearmint oil, generally present at about 0.1% by weight of the oil. The flavor characteristic of cis-carveol is of the spearmint or caraway type.

Cis-carveol belongs to the terpene groups of the cyclohexene, monoterpenoid type with the formula $C_{10}H_{16}$. Its structural formula is as follows:

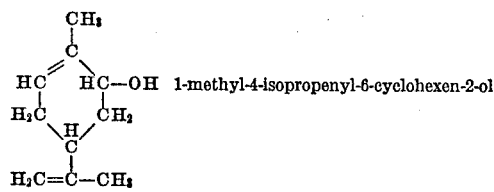

1-methyl-4-isopropenyl-6-cyclohexen-2-ol

Characteristics of a central nervous system stimulant are the ability to increase alertness and awareness, to improve neural tone, to effect arousal and make one more aware of his environment, and generally to provide a feeling of well-being. Indications that a compound or composition is in fact a central nervous system stimulant are achieved through the use of tests designed to measure increased awareness, diminished sleep time, and the like.

The following series of experiments are illustrative of techniques designed to assess the stimulatory effects of the administration of cis-carveol.

Experiment I—Effect on barbiturate induced sleep

The inhibition of barbiturate induced sleep indicates that the compound or composition may be a CNS stimulant. Male albino rats were given an anesthetic dose of barbiturate interperitoneally. Orally, prior to receiving the dose of barbiturates, one group of animals received cis-carveol in varying doses, and another group received a control vehicle, such as corn oil, equal in volume to the dose of test material given to the other group. The percent decrease of sleeptime from the control (barbiturate+vehicle) was measured with the results as follows:

TABLE I

| Dose of cis-carveol mg./kg.: | Percent decrease of sleeptime from control |
|---|---|
| 0.05 | 2.19 |
| 0.10 | 33.0 |
| 0.50 | 52.0 |
| 1.00 | 43.4 |
| 3.00 | 28.2 |
| 6.00 | 27.5 |

The above table shows that cis-carveol is effective in the inhibition of barbiturate induced sleep indicating that it is a central nervous system stimulant. The optimum dosage is seen to be about 0.1–1.0 mg./kg. for cis-carveol.

Experiment II—Effect on pentobarbitol lethality

Caffeine has been known to be capable of reversing central nervous system depression as produced by sodium pentobarbitol intoxication. This experiment was designed to determine whether similar effects are achieved using a dosage amount of cis-carveol.

Sodium pentobarbitol was administered interperitoneally at 120 mg./kg. to a group of ten male albino mice resulting in 100% lethality. Cis-carveol was adiministered to another group of mice at a dose of 0.2 mg./kg. orally. Again, the group was administered sodium pentobarbitol at 120 mg./kg.

The group of animals pretreated with cis-carveol orally at 0.2 mg./kg. and then challenged with sodium pentobarbitol at 120 mg./kg. showed that lethality was diminished down to 30% in the group, further indicating the effectiveness of cis-carveol as a central nervous system stimulant.

As can be seen from the above-presented experiments, cis-carveol produces central nervous system stimulation over a wide range of levels. A preferred range for administration of the cis-carveol is from about 0.1 mg./kg. to about 3.0 mg./kg. body weight of the subject.

Administration of a dosage amount of cis-carveol effective to produce CNS stimulation may be accomplished through the incorporation of this compound within an edible inert pharmaceutical carrier. The cis-carveol may also be incorporated within a foodstuff in amounts effective to provide the desired stimulatory effects. As previously noted, however, the cis-carveol compound has a characteristic mint-like flavor, which is excessively strong in the upper ranges of the dosage amounts effective to produce CNS stimulation. Therefore, use of this compound in a foodstuff is preferably subject to the consideration of the undesirability of severely affecting the flavor and quality of the food product. Use of the compound in a foodstuff at low dosage levels, that is, from about 0.10 to about 0.30 mg./kg. body weight of the subject is preferred, and has generally been found to be compatible with a wide variety of foodstuffs such as carbonated beverages, cereals, snacks, confections and the like. When greater dosage amounts are used the foodstuff should be selected such that the excessive spearmint taste imparted by the carveol at these levels is effectively masked.

The levels at which cis-carveol is added to a food product is necessarily dependent upon the type of food product employed. Thus, the cis-carveol should be added to the foodstuff in an amount sufficient to administer the desired effective mg./kg. level of cis-carveol upon ingestion of the foodstuff. As previously noted, these levels are preferably from about 0.1 mg./kg. to about 3.0 mg./kg., and most preferably from about 0.10 mg./kg. to about 0.30 mg./kg. For example, use of cis-carveol in a beverage drink would require addition in an amount such that such ingestion of a normal quantity of the beverage, say 8 ounces, provides an amount of cis-curveol within the ranges indicated.

I claim:

1. A method of producing central nervous systems stimulation in a subject, comprising orally administering to said subject, an amount of cis-carveol effective to produce said stimulation.

2. The method of claim 1 wherein said effective amount of cis-carveol is from about 0.10 to about 3.0 milligrams for each kilogram of body weight of said subject.

3. The method of claim 2 wherein said effective amount of cis-carveol is administered in dosage unit form within an edible inert carrier.

4. The method of claim 2 wherein said effective amount of cis-carveol is administered in a foodstuff.

5. A foodstuff containing an added amount of cis-carveol effective to produce central nervous system stimulation in a subject, said amount being about 0.10 to about 0.30 milligram for each kilogram of body weight of said subject.

References Cited

Chem. Abst., 28–2845[3] (1934).
Chem. Abst., 47–8924 (1953).

STANLEY J. FRIEDMAN, Primary Examiner